United States Patent [19]

Ayton

[11] Patent Number: 4,613,215

[45] Date of Patent: Sep. 23, 1986

[54] MOUNTING BRACKET FOR REAR VIEW MIRROR WITH SPRING DETENT

[75] Inventor: Ian F. Ayton, Palos Verdes Estates, Calif.

[73] Assignee: Orion Industries, Inc., Compton, Calif.

[21] Appl. No.: 658,524

[22] Filed: Oct. 9, 1984

[51] Int. Cl.⁴ .............................................. G02B 5/08
[52] U.S. Cl. .................................. 350/604; 350/606; 350/631; 248/478
[58] Field of Search ...................... 350/604, 606, 631; 248/477, 478

[56] References Cited

U.S. PATENT DOCUMENTS

| 1,754,540 | 4/1930 | Behrendt | 350/606 X |
| 3,081,057 | 3/1963 | Farnsworth | 350/604 X |
| 3,166,283 | 1/1965 | Farnsworth | 350/606 X |
| 3,346,229 | 10/1967 | Carson | 248/477 |
| 3,730,474 | 5/1973 | Bowers | 248/478 |
| 4,077,597 | 3/1978 | Greig | 248/477 |

FOREIGN PATENT DOCUMENTS 2745316  4/1979  Fed. Rep. of Germany ...... 350/606

*Primary Examiner*—John K. Corbin
*Assistant Examiner*—Richard F. Gallivan
*Attorney, Agent, or Firm*—Roylance, Abrams, Berdo & Goodman

[57] ABSTRACT

A mounting bracket for an automotive vehicle rear view mirror. The bracket includes a mirror-supporting arm which normally extends outwardly from the side of the automotive vehicle. A spring-loaded detent maintains the mirror-support arm in its normal position. Manually applying a pivoting force above a certain magnitude to the arm overcomes the biasing force of the detent and permits rotation of the mirror-support arm and its mirror inwardly towards the automotive vehicle to reduce the overall vehicle width.

4 Claims, 4 Drawing Figures

U.S. Patent  Sep. 23, 1986  4,613,215
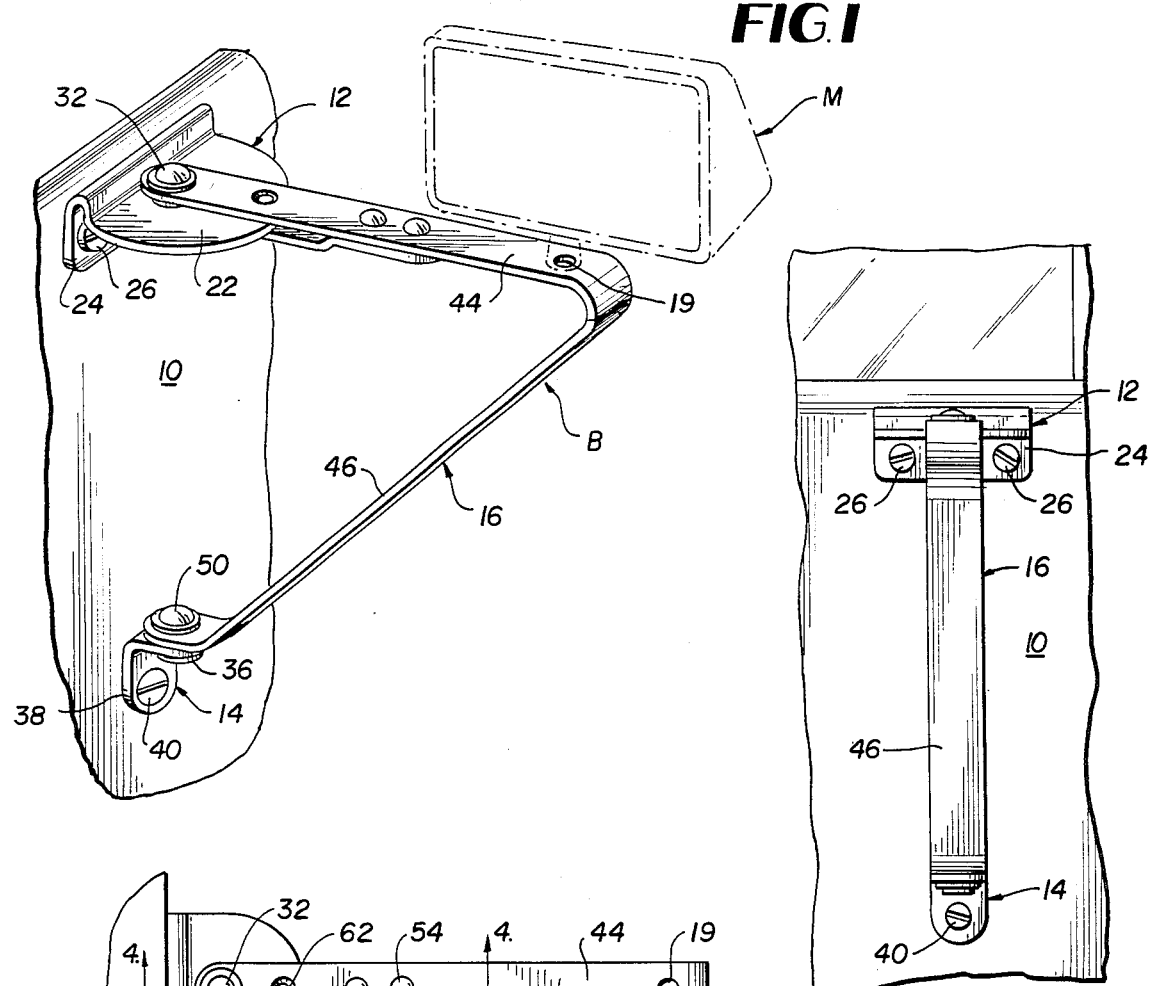
FIG.1
FIG.2
FIG.3
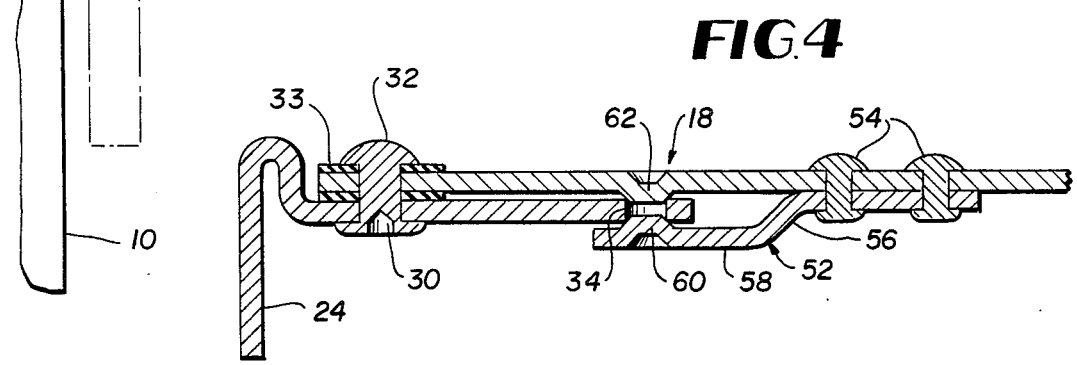
FIG.4

MOUNTING BRACKET FOR REAR VIEW MIRROR WITH SPRING DETENT

BACKGROUND OF THE INVENTION

1. Field of the Invention

The present invention relates generally to mounting arrangements for an automotive vehicle rear view mirror, and more particularly to a mounting bracket which permits relative inward pivotal movement of the mirror upon application of a pivoting force above a predetermined magnitude.

2. Prior Art

Mounting brackets between an automotive vehicle and a side mirror are known and include the use of spring-biased detents. With such prior art arrangements, when a force is applied to the mirror or its support arm which is sufficient to overcome the biasing force of the detents which normally maintain the mounting arm in its outwardly extending position. The detents will permit the spring-mounting arm to pivot inwardly towards a position alongside the vehicle. In this manner, the overall width of the vehicle can be reduced when desired, as for example, to avoid damage when the vehicle is passing obstructions. Such prior art arrangements, however, are comparatively complex and comparatively costly, requiring several parts which generally must be carefully interfitted so as to afford proper results. Examples of such prior art arrangements are represented by U.S. Pat. Nos. 2,775,919; 3,119,591; 3,306,565, 3,339,876; 3,433,511; 3,637,186; and 4,186,905.

SUMMARY OF THE INVENTION

It is a major object of the present invention to provide a mounting bracket for an automotive vehicle rear view mirror which is simple of design, requiring a minimum number of parts whereby it may have a low manufacturing cost and yet provide a long and trouble-free service life.

It is a more particular object of the present invention to provide a mounting bracket of the aforedescribed nature which includes a mirror-supporting arm that normally extends outwardly from the side of the automotive vehicle, with such arm being provided with a unique spring-loaded detent arrangement that normally maintains the mirror-support arm in its normal position with manual application of a rearward pivoting force above a predetermined magnitude overcoming the biasing force of the detent arrangment and permitting rotation of the mirror-support arm and its mirror inwardly towards the automotive vehicle.

Yet another object of the present invention is to provide a mounting bracket of the aforedescribed nature wherein the detent means includes a spring finger carried by the mirror support arm and having a dimple which is engageable with a complementary detent hole formed on a pivot plate which pivotally interconnects the mirror support arm to the automotive vehicle.

These and other objects and advantages of the present invention will become apparent from the following detailed description.

BRIEF DESCRIPTION OF THE DRAWINGS

FIG. 1 is a perspective view showing a preferred form of mounting bracket for a rear view mirror embodying the present invention.

FIG. 2 is a side elevational view of said mounting bracket.

FIG. 3 is a top plan view of said mounting bracket.

FIG. 4 is a vertical sectional view taken in enlarged scale along line 4—4 of FIG. 3.

DETAILED DESCRIPTION OF A PREFERRED EMBODIMENT

Referring to the drawings and particularly FIG. 1 thereof, there is shown a preferred form of mounting bracket B embodying the present invention secured to a side panel 10 of an automotive vehicle. Mounting bracket B includes a pivot plate, generally designated 12, secured to the side panel 10. A pivot anchor, generally designated 14, secured to the side panel 10 below the pivot plate 12, and a mirror support arm, generally designated 16, which is pivotally supported by the pivot plate 12 and pivot anchor 14 to be movable between its outwardly extending driving position shown in FIGS. 1 and 3, rearwardly to its rearwardly extending position shown in phantom outline in FIG. 3. Detent means, generally designated 18, are interposed between the mounting bracket and the mirror support arm to releasably retain such arm in its outwardly extending position. A conventional mirror M is supported at the outer portion of the mirror support arm by means of a mounting hole 19. Mirror M is not shown in FIGS. 2 and 3 in the interest of clarity.

More particularly, pivot plate 12 is preferably of integral construction, and includes an arcuate horizontally extending body 22, the inner portion of which merges into a vertically extending base 24 which is attachable to side panel 10 by suitable screws 26. The inner portion of body 22 is formed with a vertical bore 30 that receives a rivet 32 or the like by means of which the inner end of mirror support arm 16 is horizontally swingably attached to the pivot plate 12. Rubberlike washers 33 are provided for rivet 32. The outer portion of body 22 is formed with a detent hole 34. Pivot anchor 14 is of an inverted L-shape and includes a short horizontal leg 36 which is integrally connected at its inner end to a vertically extending leg 38. Leg 38 is attached to side panel 10 by a suitable screw 40. Rivets 32 and 50 are in vertical alignment.

The mirror support arm 16 includes an outwardly extending horizontal element 44 which is bent downwardly and inwardly at its outer portion to define a downwardly and inwardly extending element 46. The inner end of the downwardly and inwardly extending element 46 is horizontally swingably attached to the pivot anchor 14 by a rivet 50 or the like. An elongated spring finger, generally designated 52, is rigidly affixed by rivets 54 to the underside of the intermediate portion of the horizontal element 44 of the mirror support arm in vertical alignment with element 44. The spring finger 52 includes a downwardly and inwardly extending midportion 56, which merges into a horizontal inner section 58, the free end of which is formed with a raised detent dimple 60. A complementary depressed detent dimple 62 is formed in the horizontal element 44 of mirror support arm above the lower dimple 60 in vertical alignment with the lower dimple. As indicated particularly in FIG. 4, the upper and lower dimples 60 and 62 are releasably engageable with the detent hole 34 formed in the outer portion of pivot plate 12. It should be understood that lower detent dimple 60 is constantly resiliently biased upwardly into detent hole 34. It should also be understood that vertical projections other than dimples could be utilized for releasable engagement with detent hole 34.

In the operation of the aforedescribed mounting bracket B, during normal driving conditions, the mirror support arm 16 will be retained in its outwardly extending driving position of FIG. 1 by the engagement of dimples 60 and 62 with detent hole 34. When it becomes desirable to retract the mirror support arm and its mirror to the phantom outline position of FIG. 3, it is only necessary to manually exert a rearward pivoting force of a predetermined magnitude to the arm so as to cam the spring finger 52 downwardly whereby the latter's dimple 60 will move out of the confines of the detent hole. Simultaneously, the upper dimple 62 will be moved out of the detent hole as the mounting arm and pivot plate 12 are cammed apart. Once the dimples have been disengaged from the detent hole, they will frictionally engage the upper and lower surfaces of the pivot plate so as to frictionally resist inadvertent swinging movement of the mirror support arm. It should be noted that the mirror support arm may also be swung forwardly from its normal driving position.

Various modifications and changes may be made with respect to the foregoing detailed description with departing from the spirit of the present invention.

I claim:

1. A mounting bracket for a vehicle rear view mirror, said mounting bracket comprising:

a pivot plate securable at its inner portion to a vehicle and formed with a vertically extending detent hole at its outer portion;

a pivot anchor securable to the vehicle below said pivot plate in vertical alignment therewith;

a mirror support arm having a horizontal element that is attached to a mirror at its outer portion and a downwardly and inwardly extending element connected to the outer end of said horizontal element, with the lower end of said downwardly and inwardly extending element being pivotally connected to said bracket;

pivot means connecting the inner end of the horizontal element of said mirror support arm to the intermediate portion of said pivot plate;

an elongated spring finger in vertical alignment with said mirror support arm, connected at its outer portion to said arm, with the free end of said finger being biased vertically upwardly toward said pivot plate; and vertically aligned detent projections on said mirror support arm and said spring finger that are vertically aligned with said detent hole to extend thereinto so as to releasably retain said mirror support arm in a position extending away from the vehicle.

2. A mounting bracket as set forth in claim 1 wherein said detent projections are dimples formed on said mirror support arm and said spring finger.

3. A mounting bracket as set forth in claim 2 wherein said detent projections frictionally engage said pivot plate to frictionally resist inadvertent swinging movement of the mirror support arm.

4. A mounting bracket as set forth in claim 1 wherein said detent projections frictionally engage said pivot plate to frictionally resist inadvertent swinging movement of the mirror support arm.

* * * * *